United States Patent
Baird et al.

(10) Patent No.: US 7,927,492 B2
(45) Date of Patent: Apr. 19, 2011

(54) FILTER ASSEMBLY, BIOREACTOR CATCH BASIN AND METHOD OF USING THE SAME

(76) Inventors: William E Baird, Cohasset, MA (US); William I. Young, North Scituate, MA (US)

( * ) Notice: Subject to any disclaimer, the term of this patent is extended or adjusted under 35 U.S.C. 154(b) by 191 days.

(21) Appl. No.: 11/921,682

(22) PCT Filed: Jun. 6, 2006

(86) PCT No.: PCT/US2006/021834
§ 371 (c)(1),
(2), (4) Date: Feb. 18, 2009

(87) PCT Pub. No.: WO2006/133139
PCT Pub. Date: Dec. 14, 2006

(65) Prior Publication Data
US 2009/0206030 A1    Aug. 20, 2009

Related U.S. Application Data

(60) Provisional application No. 60/687,870, filed on Jun. 7, 2005.

(51) Int. Cl.
*C02F 9/14* (2006.01)

(52) U.S. Cl. ........ 210/608; 210/615; 210/631; 210/694; 210/747; 210/151; 210/170.03; 210/282

(58) Field of Classification Search .................. 210/608, 210/615, 617, 631, 691, 694, 747, 150, 151, 210/162, 163, 164, 170.03, 282
See application file for complete search history.

(56) References Cited

U.S. PATENT DOCUMENTS

| | | | |
|---|---|---|---|
| 3,882,027 A * | 5/1975 | Lunt | 210/150 |
| 4,039,437 A | 8/1977 | Smith et al. | |
| 4,333,893 A | 6/1982 | Clyde | |
| 4,427,548 A * | 1/1984 | Quick, Jr. | 210/617 |
| 4,576,718 A * | 3/1986 | Reischl et al. | 210/151 |
| 4,810,385 A * | 3/1989 | Hater et al. | 210/150 |
| 4,925,564 A | 5/1990 | Francis | |
| 5,164,089 A | 11/1992 | Preston | |
| 5,221,470 A * | 6/1993 | McKinney | 210/151 |
| 5,516,687 A * | 5/1996 | Perez et al. | 210/617 |
| 5,543,039 A * | 8/1996 | Odegaard | 210/150 |
| 6,428,701 B1 | 8/2002 | Mullennix et al. | |
| 6,447,675 B1 * | 9/2002 | James | 210/150 |
| 7,166,221 B1 * | 1/2007 | Young et al. | 210/608 |

* cited by examiner

*Primary Examiner* — Christopher Upton
(74) *Attorney, Agent, or Firm* — Birch, Stewart, Kolasch & Birch, LLP

(57) ABSTRACT

Provided is a filter assembly for a bioremediating catch basin. The filter assembly comprises a container having at least one inlet and at least one outlet; a carrier substance, such as a foam, which carries a microorganism capable of digesting hydrocarbons; and optionally an adsorbent material. The filter assembly also optionally has structures for overflow conditions which allow the exit of water, but not floating contaminants from the catch basin. Also provided is a replaceable cartridge for the filter assembly. Also provided is a method for bioremediation of polluted water.

24 Claims, 2 Drawing Sheets

FILTER ASSEMBLY, BIOREACTOR CATCH BASIN AND METHOD OF USING THE SAME

This application is the National Phase of PCT/US2006/021834 filed on Jun. 6, 2006, which claims priority under 35 U.S.C. 119(e) to U.S. Provisional Application No. 60/687,870 filed on Jun. 7, 2005, the entire contents of which are hereby incorporated by reference.

BACKGROUND OF THE INVENTION

Field of the Invention

The present invention relates to a bioreactor catch basin for the bioremediation of a polluting substance. The catch basin utilizes a filter assembly which comprises a microorganism carrying foam, and optionally an adsorbent for dissolved organic molecules. The foam absorbs free-floating and dissolved contaminants and provides sites for the microorganisms, which degrade fats, oils, grease, feces and volatile compounds.

Pollution of the earth's environment by harmful and non-decomposable contaminants is a major concern posing a threat to the health and safety of all living creatures. For example, contamination of the world's water resources presents a global environmental hazard. Potential contaminants includes petroleum hydrocarbons, for instance, fuels and oils. Due to pollution, these contaminants may be found in water sources or may be washed into water sources during storms or wet conditions.

There is a well-recognized need for remediation, or the clean up, of pollutants that exist in a variety of settings, including water, soil, and sediment collections. Water supplies may potentially be kept clean by preventing contamination from entering the water supply. The EPA has identified storm water run off as a major contributor to the pollution of water sources. In non-point source contamination, storm water directs contamination into storm water catch basins and sewer systems. Such contamination can include dissolved and floating organic molecules such as oils and grease. With increasing pollution, there exists a need to regulate and monitor the discharge from such storm water systems.

Currently, the majority of petroleum wastes are processed via mechanical means, including confinement booms, surface-skimmers, oil-water separators, etc. However, these mechanical methods of petroleum contaminant reduction generally do not sufficiently reduce the levels of petroleum deposits in solution sufficient to protect the environment. For example, a problem known with mechanical confinement technologies is that concentrations of petroleum hydrocarbon contaminants remaining in the water phase often exceed the regulatory-allowed limits for discharge into open waters.

However, the present invention makes use of the technology of bioremediation wherein naturally occurring microorganisms, such as Archaea and/or bacteria, are utilized to actively consume toxic hydrocarbon compounds and transform them into harmless byproducts. Bioremediation takes place when microorganisms are activated and exposed to targeted hydrocarbons or organic compounds and convert them into products such as water-soluble fatty acids, carbon dioxide, water, oxygen, and trace carbon.

Although various mechanical and biochemical means for removal of hydrocarbon pollution are known, few are satisfactory in the perspective of cost, ease of operation, and efficiency. All of the systems have drawbacks and limitations. In some cases, the limitations relate to the degree of removal that can be accomplished with a specific system or piece of equipment. In others, the application of high concentrations of bacteria to a particular polluted area has resulted in secondary pollution due to diffusion of the bacteria to adjacent areas.

Furthermore, typical products for bioremediation on the market today require extensive packaging and delivery systems that often must be removed from the contaminated site after the bioremediation has taken place.

The present invention provides a catch basin that allows for bioremediation of pollutants. Such a "bioreactor" catch basin can be used to prevent contaminated water from entering water sources, or to treat contaminated water sources. Ordinary catch basins can be modified according to the present invention to allow for the bioremediation of polluted water supplies with microorganisms. The present invention utilizes a microorganism which is not auxotrophic and preferably does not require any additional nutrients to survive. The microorganism is preferably from the domain Archaea, which is more effective than any other currently known bacterium used for bioremediation.

BRIEF SUMMARY OF THE INVENTION

The present invention provides a filter assembly for a catch basin, the filter assembly comprising a carrier material, such as a foam substance, which carries microorganisms capable of digesting hydrocarbons, and optionally an adsorbent. The microorganisms are preferably from the domain Archaea. In its simplest sense the carrier material, such as foam, is fitted to the discharge pipe of a catch basin. In one embodiment, the foam and associated microorganisms are described in pending U.S. application Ser. No. 10/602,281, and WO 05/042406 A2, which are herein incorporated by reference.

In one embodiment, the filter assembly comprises a container having at least one inlet and at least one outlet. Foam carrying microorganisms capable of digesting hydrocarbons is placed around at least a portion of the container, preferably not covering the least one inlet or the at least one outlet and preferably being present at the level of the at least one outlet or at the level of a discharge point from any container to which the filter assembly is attached. In a space defined within the container, there may optionally be placed an adsorbent material, such as granulated activated carbon. The adsorbent material is preferably placed in a location between the at least one inlet and the at least one outlet, such that under regular conditions, water must pass through the adsorbent to exit the filter assembly. The adsorbent material is preferably capable of capturing dissolved organic molecules and/or providing a location for the proliferation of the microorganisms. The at least one inlet of the container is open, either directly or indirectly, to the interior of or a water supply in the catch basin while the at least one outlet is attached, either directly or indirectly, to at least one discharge point from the catch basin.

In one embodiment, the container is designed as a cartridge. The cartridge is a detachable, replaceable container having at least one inlet and at least one outlet. The inside of the cartridge is substantially filled with adsorbent and the outside of the cartridge is substantially covered with microorganism carrier material, preferably foam. This cartridge may comprise substantially all of the filter assembly such that the at least one inlet and at least one outlet of the cartridge correspond to the at least one inlet and at least one outlet of the filter assembly. The at least one inlet of the cartridge allows entry of contaminated water from a catch basin, and once fitted to the discharge point of the catch basin, the at least one outlet of the cartridge allows exit of the water. The contaminated water preferably passes through the adsorbent prior to exiting the cartridge.

Under normal conditions, water is intended to flow through the inside of the container, and at least a portion of which water is intended to flow through the optional adsorbent material. The preferred direction of flow is from the at least one inlet of the container to the at least one outlet.

Under overflow conditions water may substantially bypass the portion of the container containing the optional adsorbent, entering through an optional overflow inlet, which overflow inlet is an inlet other than the inlet associated with the adsorbent. That is, the overflow inlet is separate from the inlet through which once water enters, at least a portion of the water must pass through the optional adsorbent prior to reaching the at least one outlet. However, when overflow water passes into this overflow inlet, the overflow water has direct access to the at least one outlet, without having to substantially pass through the optional adsorbent.

In one embodiment, the filter assembly according to the present invention further comprises at least one overflow conduit connected to the overflow inlet of the container. The overflow conduit is designed and attached such it allows overflow water to enter, but substantially prevents entry of floating debris or floating contaminants. An inverted U-shaped pipe or gooseneck attached to an overflow inlet at the top of the container system is one embodiment of such an overflow conduit. Once entering the overflow conduit, overflow water may pass from the overflow inlet to the at least one outlet without substantially passing through the portion of the container containing the optional adsorbent.

The present invention also provides a method for bioremediation, comprising the steps of delivering the present filter assembly described above to a catch basin, delivering contaminated water to the catch basin, which water contains dissolved hydrocarbons, allowing the hydrocarbons to access the microorganisms, allowing the microorganisms to convert the contaminants to natural byproducts, and allowing bioremediated water to exit the catch basin.

DETAILED DESCRIPTION OF THE INVENTION

Figure 1:
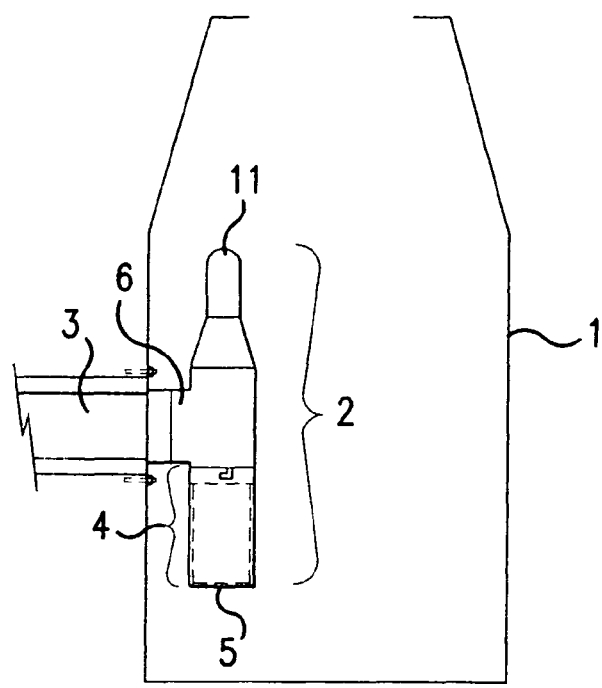
FIG. 1 is a side view of a catch basin containing the filter assembly according to the present invention.

The present invention relates generally to a filter assembly for the bioremediation of pollutants in water, and specifically to bioremediation of hydrocarbon and organic pollution in fresh and salt water. The invention relates to a microorganism-containing product and method of use thereof for removing hydrocarbons from catch basins and the like. Additional applications include any location for the deposit of water and/or pollutants, such as catch basins, holding tanks, septic tanks, and grease traps.

In one embodiment, the present invention provides a filter assembly for a water system such as a catch basin. The filter assembly is fitted at the point of exit of water from the catch basin.

In another embodiment, the filter assembly comprises a container having at least one inlet and at least one outlet. A carrier material, such as foam, which carries microorganisms capable of digesting hydrocarbons, is placed around at least a portion of the container, preferably not covering the least one inlet or the at least one outlet and preferably being present at the same level as the level of the lowest of the at least one outlet or discharge point of any container to which said filter assembly is attached. In a space defined within the container, there may optionally be placed an adsorbent material, such as granulated activated carbon. The adsorbent material is preferably capable of capturing dissolved organic molecules and/or providing a location for the proliferation of the microorganisms. The at least one inlet of the container is open, either directly or indirectly, to the interior of or a water supply in the catch basin while the at least one outlet is attached, either directly or indirectly to a discharge point from the catch basin. Water is intended to flow through the inside of the container, and at least a portion of which water is intended to flow through the optional adsorbent material. The preferred direction of flow is from the at least one inlet of the container to the at least one outlet.

In another embodiment of the invention, the filter assembly comprises a container having at least one inlet designed for regular water flow, at least one inlet designed for overflow water flow and at least one outlet. A carrier material, such as foam, which carries microorganisms capable of digesting hydrocarbons, is placed around at least a portion of the container, preferably not covering either an inlet or an outlet. In a space-defined within the container, there may optionally be placed an adsorbent material, such as granulated activated carbon. Under normal conditions, water is intended to flow through the inside of the container, and at least or portion of which water is intended to flow through the adsorbent material. The preferred direction of flow is from the at least one inlet of the container to the at least one outlet. Under overflow conditions water may substantially bypass the portion of the container containing the adsorbent, entering through an overflow inlet, which overflow inlet is an inlet other than the inlet associated with the adsorbent. That is, the overflow inlet is separate from the inlet through which once water enters, at least a portion of the water must pass through the adsorbent prior to reaching the at least one outlet. When overflow water passes into the overflow inlet, the overflow water has direct access to the at least one outlet, without having to substantially pass through the adsorbent.

In yet another embodiment, the filter assembly according to the present invention further comprises at least one overflow conduit connected to an overflow inlet of said container. The overflow conduit is designed and attached such it allows water to enter, but substantially prevents entry of floating debris or floating contaminants. An inverted U-shaped pipe or gooseneck attached to the top of the container system is one embodiment of such an overflow conduit. The overflow conduit allows water to flow from the at least one overflow inlet to the at least one outlet.

In one embodiment, the filter assembly is designed as a cartridge. The cartridge is a detachable, replaceable container having at least one inlet and at least one outlet. The inside of the cartridge is substantially filled with adsorbent and the outside of the cartridge is substantially covered with a microorganism carrier material, such as foam, which carries the microorganism. This cartridge may comprise substantially all of the filter assembly such that the at least one inlet and at least one outlet of the cartridge correspond to the at least one inlet and at least one outlet of the filter assembly. The at least one inlet of the cartridge allows entry of contaminated water from a catch basin, and once fitted to the discharge point of the catch basin, the at least one outlet of the cartridge allows exit of the water. The contaminated water preferably passes through the adsorbent prior to exiting the cartridge.

The present invention provides a method for bioremediation, comprising the steps of delivering the filter assembly described above to a catch basin, delivering contaminated water to the catch basin, which water contains dissolved hydrocarbons, allowing the hydrocarbons to access the microorganisms, and allowing the microorganisms to convert the contaminants to natural byproducts.

1. Filter Assembly

A. Container

The container for the present filter assembly has at least one inlet and at least one outlet. Water may enter through the at least one inlet and exit through the at least one outlet. The at least one inlet of the container is open, either directly or indirectly to a water supply. The at least one outlet is connected either directly or indirectly to a discharge point where water is to be released.

The interior space of the container may also serve as a location for the growth of microorganisms according to the present invention. These microorganisms may grow either on the inside surface of said container or on anything located within said container.

At least a portion of the interior of the container optionally contains an adsorbent material. This adsorbent material is preferably designed to be capable of capturing dissolved organic molecules and/or optionally providing a location for the proliferation of the present microorganisms.

The container defines an interior space to allow the passage of water. Water is intended to flow through the inside of the container, and at least a portion of which water is optionally intended to flow through the adsorbent material. The preferred direction of flow is from the at least one inlet of the container to the at least one outlet.

The container may be made of any suitable material, for instance, metal, wood, plastic, ceramic, etc.

In one embodiment, the entire container or a portion of the container is designed as a cartridge. The cartridge is detachable and replaceable and has at least one inlet and at least one outlet. The inside of the cartridge is preferably substantially filled with adsorbent and the outside of the cartridge is preferably substantially covered with microorganism carrying carrier, such as foam. This cartridge may comprise substantially all of the filter assembly such that the at least one inlet and at least one outlet of the cartridge correspond to the at least one inlet and at least one outlet of the filter assembly. The at least one inlet of the cartridge allows entry of contaminated water from a catch basin, and once fitted to the discharge point of the catch basin, the at least one outlet of the cartridge allows exit of the water. The contaminated water preferably passes through the adsorbent prior to exiting the cartridge.

B. Carrier Material

The carrier material, which carries the microorganisms capable of digesting hydrocarbons, is placed around at least a portion of the container. Preferably, the carrier material is a foam that does not cover the least one inlet or the at least one outlet. Also, the carrier material is preferably present at least at a point on the container at the same level of the lowest of said at least one outlet at the same level of the discharge point of any catch basin or other container to which the filter assembly is attached.

The nature of the carrier material, such as foam, is not limiting. The carrier material, which is preferably a foam, may be a cross-linked polyethylene foam. Different densities and different carrier materials (e.g., foams) may be selected such as polyethylene, polyurethane, polypropylene, or rubber. The carrier must be capable of accepting the microorganisms, for instance via openings such as slits, bores, etc.

In a preferred embodiment, the carrier is that described in U.S. application Ser. No. 10/602,281, or WO 05/042406 A2, which are herein incorporated by reference.

C. Microorganisms

The present invention may utilize any microorganism known for its ability to remediate, or digest, hydrocarbons. The source of the microorganisms is not limited, so long as the microorganism has the ability to remediate the pollutant to be removed. The microorganism is preferably not auxotrophic.

Microorganisms from the domain Archaea are a preferable element of the present invention. It is known in the art that there are three major groups of prokaryotes. i.e., bacteria, Archaea, and Eukarya, which are classified based upon comparative genetic analysis of the nucleotide sequences of their small subunit ribosomal RNA (ssrRNA). In addition to differences in ssrRNA, microorganisms of domain Archaea also possess unifying archaeal features (i.e., no murein in cell wall, ester-linked membrane lipids, etc.) that differentiate them from bacteria. Many of these unique structural and biochemical attributes allow microorganisms of the domain Archaea to live in extreme habitats, including very high temperatures (hyperthermophiles) and very high concentrations of salt (extreme halophiles).

In a preferred embodiment, MICROSORB® microbial products, sold by Microsorb Environmental Products, Inc. of Norwell, Miss. is the source of hydrocarbon digesting microorganisms used in the present invention. MICROSORB® is designed to optimize the recycling phenomena with the addition of oil-eating microbes. MICROSORB® microbial products contain naturally occurring microbes of the domain Archaea that convert hydrocarbon contaminants into non-toxic components, thereby eliminating the problem of disposal.

MICROSORB® microbial products are available in three grades: MICROSORB® ER (Emergency Response), MicroSorb® IS (Industrial Strength), and MicroSorb® SC (Super Concentrate)

MICROSORB® ER is particularly useful for oil and chemical treatment, and can be used to attack any petroleum based liquids (i.e., gasoline, fuel oil, and hydrocarbon solvents), virtually any hydrocarbon, and oxygenated hydrocarbon. MICROSORB® ER contains a consortium of over 140 billion hydrocarbon digesting microbes per ounce contained in bentonite clay carrier.

MICROSORB® IS is particularly useful for bioremediation of organic matter, and can be used to attack any petroleum based liquids (i.e., gasoline, fuel oil, hydrocarbon solvents) and organic wastes), as well as virtually any hydrocarbon and oxygenated hydrocarbon. MICROSORB® IS contains a consortium of over 560 billion hydrocarbon digesting microbes per ounce contained in bentonite clay carrier.

MICROSORB® SC is a super concentrated microbial consortium particularly useful for bioremediation in oxygen-limiting environments, and can be used to attack any petroleum based liquids (i.e., gasoline, fuel oil, hydrocarbon solvents) and organic wastes), as well as virtually any hydrocarbon and oxygenated hydrocarbon. MICROSORB® SC contains a consortium of over 2.5 trillion hydrocarbon digesting microbes per ounce contained in bentonite clay carrier. MICROSORB® SC, because of its high microbe content, has the ability to attack hydrocarbons in oxygen limited environments, such as below grade and in groundwater.

As noted above, the present invention may utilize any microorganism known for its ability to remediate, or digest, hydrocarbons. Examples of such microorganisms are bacteria such as *Pseudomonas* sp., *Acinetobacter* sp., *Metyiosinus* sp. and the like which exhibit activities of pollutant-decomposition are suitable for removal of dyes having an aromatic ring or furan structure, pigments, surfactants, surface-coating agents, adhesives, organic solvents, petroleum type pollutants, etc.

Several other microorganisms suitable for use in the present invention are described in U.S. Pat. No. 3,843,517, the contents of which are hereby incorporated by reference.

In the present invention, the microorganisms are preferably contained in an inert preparation of inorganic material (e.g., clay or bentonite clay). Further, a trace amount of oil (e.g., crude oil or oil on which the microorganisms are weaned) is present in the preparation in order to maintain the microorganisms in a dormant state for storage, transport, etc. However, the present invention does not require the addition of any additional nutrient to the biodegradable carrier, tablet/powder, and/or inert material, such as one or more amino acids, nucleic acid bases, vitamins, organic acids, or other growth factors in order to maintain viability of the microorganisms. Preferably, no enzymes are present in the microorganism preparation. This preparation may be compressed into tablets that absorb water and hydrocarbons.

The microorganism preparation may be placed into the foam to absorb water and hydrocarbons. That is, the microorganisms within the inert preparation, optionally formed into pellets/tablets or present as a powder, may be inserted into the foam via any opening such as holes, slits, etc.

The microorganism preparation will dissolve and release the microorganisms into the contaminant during remediation. The microorganisms are activated and consume and convert the contaminant into natural byproducts, such as fatty acids, carbon dioxide, water, etc. Once the contaminants have been exhausted, the microorganisms will either die, return to former natural concentration levels, or be eaten by other organisms.

As used herein, "trace amounts" also refers to an insignificant amount, or an amount not visible to the eye or readily measurable, or an amount of oil that is so small that it does not add any significant amount of oil to the hydrocarbon to be remediated. In a preferred embodiment, tablets of the microbes held in a inert material (e.g., clay) are inserted into the foam.

The microorganisms may be prepared in tablet form together with an inert carrier by use of a pill-making machine, which preparation is conventional in the art. Preferably, however, the present invention utilizes a tablet-making template and a compression press to create the tablets. This method for forming tablets does not require the use of any additional binders or additives other than those (e.g., clay and trace amounts of crude oil) in which the microorganisms are commercially packaged, so that the concentration levels of the microorganism are not compromised.

In a preferred embodiment, the tablet-making template is a piece of foam having the following characteristics: resiliency, flexibility, tear-resistance, and chemical suitability for the microorganism. The tablet-making template is preferably cross-linked polyethylene foam. The tablet-making template can be made of different densities and different foams such as polyethylene, polyurethane, polypropylene, or rubber. Typical examples of such a foam are Volara Type A®, a flexible closed cell irradiation cross-linked polyethylene foam, and Minicel L200® and L300®, closed cell chemically cross-linked polyethylene foams. These products are commercially available from Voltek (Lawrence, Mass.). Suitable cross-linked polyurethane foams are also commercially available from Cellect LLC (St. Johnsville, N.Y.).

A typical tablet-making template, is approximately 10×5.5×⅜". The template is impregnated with holes approximately ⅝" wide in which the tablets are to be formed. The skilled artisan would understand that the size and thickness of the template, as well as the depth, diameter, and shape of the holes, may be varied in order to achieve different results. For example, the holes may be varied in order to make different dimensions, sizes, and thickness of the tablets, which in turn affects the properties of the tablets.

The microorganisms are preferably admixed with an inorganic inert material (e.g., clay) and placed into the holes of the tablet-making template. The template is placed onto a commercial compression press. The type of compression press could be a Hudson or Samco or any other press similar to what the industry knows as a die cutter or a compression machine. Approximately 10-40 tons, and preferably 20-30 tons, of pressure is applied to the tablet-making template of the size 10×5.5×⅜". The amount of pressure may be increased or decreased depending on the size of the tablet-making template utilized. A mixture of microorganisms in an inert material, preferably with trace amount of crude oil, are spread into the holes of the template and the press is then activated, which compress the foam thereby forming the microorganisms into tablets. The tablets are then extracted from the holes. When extracted, the tablets may be, in general, slightly larger than the holes of the template due to the flexibility of the foam.

The hydrocarbon degrading microorganisms may also be contained within a biodegradable carrier. The biodegradable carrier may be a starch, such as cornstarch, or rice paper, and may contain a hole, slit, Opening, pore, etc. The biodegradable carrier may be that described in U.S. application Ser. No. 10/602,281, which is herein incorporated by reference. The filter assembly may also contain a fragrance.

D. Optional Adsorbent Material

The interior of the container optionally contains an adsorbent material. The adsorbent material is contained in at least a portion of the interior of the container. Preferably, water passes through the adsorbent material before being passed to the outlet.

The adsorbent material is capable of adsorbing dissolved contaminants, such as dissolved organic molecules. Examples of dissolved organic molecules include, but are not limited to fats, oils, greases, feces, volatiles, etc. Other contaminants include those listed below as "pollutants."

Examples of adsorbents include, but are not limited to aluminas, for instance activated aluminas produced from hydrated alumina; silicas, such as silica gels; zeolites, such as aluminosilicates; carbons, such as activated carbons; and polymers, such as polymer adsorbents made of polystyrene/divinylbenzene copolymers.

Preferably activated carbon is used as an adsorbent. Activated carbon is the common term used for a group of absorbing substances of crystalline form, having large internal pore structure that make the carbon more absorbent.

More preferably, granulated activated carbon is used as an adsorbent. Commercially available activated carbon, such as that supplied by Calgon Carbon Corporation, for instance, CARBSORB™ 30 and CARBSORB™ 40 of Calgon Carbon Corporation, Pittsburgh, Pa.

E. Optional Overflow Conduit

The filter assembly is optionally fitted with an overflow conduit. The overflow conduit is attached to an overflow inlet of the container. The overflow conduit has its own inlet which channels water from the inlet of the overflow conduit to the overflow inlet of the container and ultimately to the outlet of the container.

The purpose of the overflow conduit is to limit the amount of floating debris and floating contaminants (e.g., oils and greases), which exit the catch basin in the event of an overflow of water. Normally, in the event of an overflow, floating material in a conventional catch basin will exit, however, this is substantially avoided by the use of the present overflow conduit.

The overflow conduit is fitted to the filter assembly in such a manner that it allows water to enter the outlet of the container, but does not allow floating contaminants to enter the outlet. For instance, this is accomplished by an inverted U-shaped conduit, or gooseneck, which will allow entry of water from below an overflow water line. This removes water from below the overflow water line while keeping floating contaminants at a location which is above the inlet to the overflow conduit. This effectively prevents the entry of floating contaminants to the overflow conduit and thus to the outlet.

When the water level is not at overflow levels, the level of the water is preferably below that of the inlet to the overflow conduit and preferably above the at least one inlet to the container, and thus floating contaminants are maintained in the catch basin. Likewise, when the water level rises to overflow levels, the level of the water is above that of the inlet to the overflow conduit and thus floating contaminants are maintained in the catch basin, while water is allowed to exit.

2. Pollutants

The present filter assembly can be used effectively on any of the following non-limitive materials: acenapthene, alkylamine oxides, benzene, chlorinated phenols, chloro naphthalene, cyanide, diethyleneglycol, fuel oils #1-6, heptane, isoprene, long chain alkenes, mercaptan, motor oils (not synthetic), nitrated phenols, oil based paints, pentane, phthalate esters, secondary alkylbenzene, trichloroethylene, xylene, acrolein, animal (including human) wastes, biphenyl, chlorobenzene, crude oil, dichlorobenzene, ethylbenzene, gasoline, hexane, hexane, jet fuels, lubricating oils, methylene chloride, MTBE, oil based fluids, organic herbicides, phenoxyacetates, polycyclic aromatics, sewage, vegetable oils, acrylonitrile, aromatics, brake fluids, chloroform, cutting oils, diesel fuels, fluoranthene, grease, hydraulic oils, kerosene, marine fuels, monoalkylbenzenes, naphthalenes, oil based inks, organic pesticides, phenylureas, pulp by-products, toluene, and volatile organic compounds (VOCs).

As the microbes feed on the hydrocarbons, the population of microbes increases, allowing faster and more effective contaminant reduction. This increased population of microbes is sustainable only as long as sufficient hydrocarbons remain. Once the hydrocarbons have been remediated, the microbes die, return to initial levels, or are consumed by other organisms in the environment.

3. Catch Basin and Method

Figure 2:
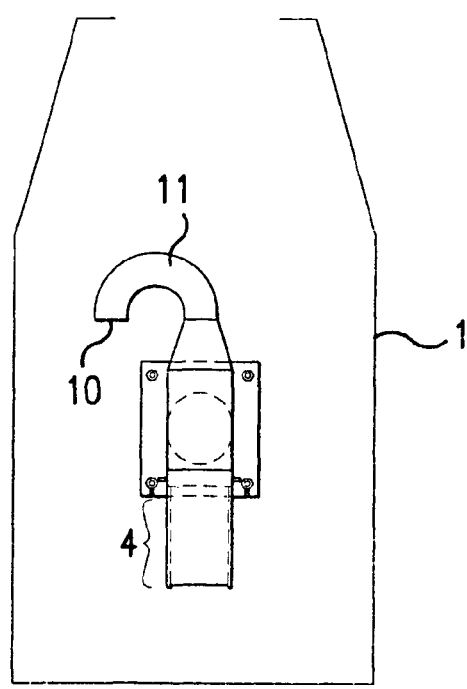
FIG. 2 is a side view of a catch basin containing the filter assembly according to the present invention.
Figure 3:
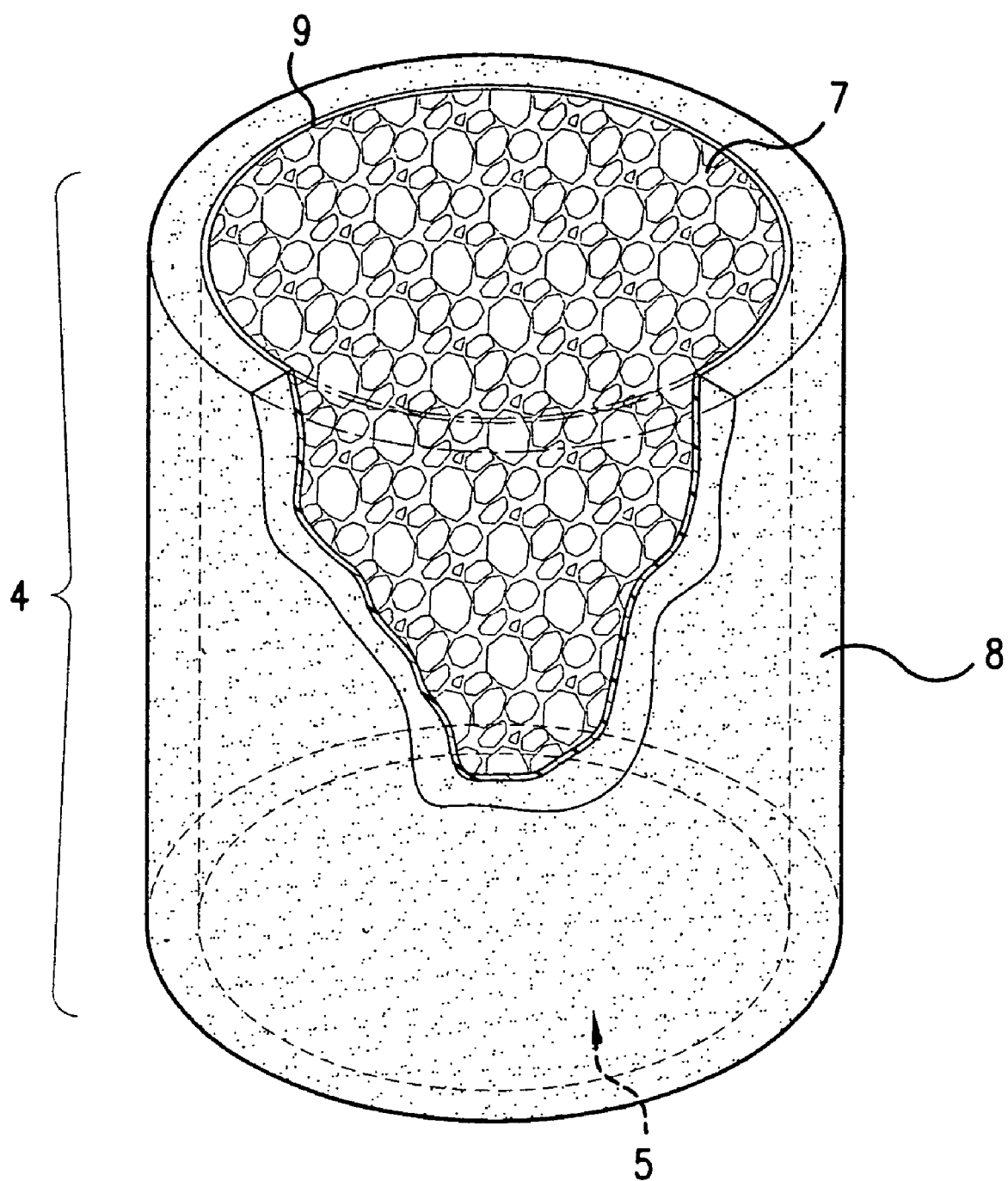
FIG. 3 represents one embodiment of a portion of a filter assembly according to the present invention.

The filter assembly according to the present invention may be retrofitted to any existing catch basin. Referring to FIGS. 1-3, the outlet (6) of the filter assembly (2) is fitted to the discharge point (3) of any catch basin (1).

During operation, water containing contaminants will enter the catch basin (1). Once the water reaches the level of the filter assembly (2), the water will begin to access the microorganism carrying carrier material (e.g., foam) (8) surrounding the container. The location of the carrier material is preferably the same as the location of the container which contains the adsorbent (7), and/or preferably the level of the discharge point (3) of the catch basin. This location is represented by (4) in FIGS. 1-3. The microorganisms will be then be released into the system and proceed to degrade pollutants such as hydrocarbons.

For water to exit the catch basin (except under overflow conditions), the water must enter an inlet (5) to the filter assembly and pass through an adsorbent (7) to reach the outlet (6). When the water passes through the adsorbent (7), organic molecules such as oils and grease dissolved in the water are adsorbed to the adsorbent. These adsorbed molecules may then be captured and/or degraded by the microorganisms.

After passing through the adsorbent (7), the water will then pass through the outlet (6) of the filter assembly and thus out the discharge point (3) of the catch basin.

The microorganism carrying carrier material (e.g., foam) (8) is fitted to at least the outside of the filter assembly. Preferably, the foam is fitted to a location of the container (9) where the foam may access the contaminated water. For instance, when foam is fitted at a point on the container (9) which is at the same level as the outlet (6) from the filter assembly or the discharge point (3) of the catch basin, it will presumably be in optimum contact with the contaminated water, including any floating contaminants such as oils and greases. This is due to the fact that water seeks its own level and thus, absent overflow conditions, the water level in the catch basin will usually be level to the discharge point (3) of the catch basin.

In the event of an overflow, excess water may bypass the inlet (5) which leads to the adsorbent and pass directly from an inlet (10) of the overflow conduit (11) to the outlet (6) of the container and thus be discharged from the catch basin.

Referring specifically to FIG. 3, the filter assembly of the present invention may be designed as a cartridge. The cartridge is detachable and replaceable and has at its core, a container wall (9). The container has an inlet (5) at the bottom and an outlet at the top. The inside of the cartridge is substantially filled with adsorbent material (7) and the outside of the cartridge is substantially covered with microorganism carrying carrier material (e.g., foam) (8). Not shown in the figure is wire mesh at the inlet and outlet of the cartridge, which holds the adsorbent in place. This cartridge may comprise substantially all of the filter assembly such that the inlet and the outlet of the cartridge correspond to the at least one inlet and at least one outlet of the filter assembly. The inlet of the cartridge allows entry of contaminated water from a catch basin, and once fitted to the discharge point of the catch basin, the outlet of the cartridge allow exit of the water. The contaminated water must pass through the adsorbent prior to exiting the cartridge.

Thus, the present invention provides a method for bioremediation, comprising the steps of delivering the present filter assembly described above to a catch basin, delivering contaminated water to the catch basin, which water contains dissolved hydrocarbons, allowing the hydrocarbons to access the microorganisms, allowing the microorganisms to convert the contaminants to natural byproducts, and allowing bioremediated water to exit the catch basin.

EXAMPLES

A catch basin substantially as shown in FIGS. 1 and 2, except that it lacked an overflow conduit (11) was prepared. Granulated activated carbon was used as an adsorbent. MICROSORB® ER was used as the microorganism. 6 oz. of gasoline and 6 oz. of #2 fuel oil (1000 mg/L of each fluid), dissolved in water, were added to the catch basin along with water. The fuel mixture and water were of a sufficient volume such that the top line of the water level reached the cartridge (4) of the filter assembly. Three days later, the water in the catch basin was displaced by one volume of water. At different points in time, the water in the catch basin and the discharge water were sampled and analyzed to determine the amounts of various components.

The results of the analysis are shown in the following table:

TABLE 1

Analysis of Chemical Components in Catch Basin Water (CBW) and Discharge Water (DW) at Various Intervals of Time

| Chemical Components ($\mu g/L$) | DAY 1 8:15 am CBW | DAY 2 8:15 am CBW | DAY 2 9:22 am CBW | DAY 2 9:27 am DW | % Reduction | DAY 4 1:54 pm CBW | DAY 4 1:59 pm DW | % Reduction |
|---|---|---|---|---|---|---|---|---|
| Volatile Petroleum Hydrocarbons | | | | | | | | |
| $C_5$-$C_8$ Aliphatic Hydrocarbons | BRL | BRL | BRL | BRL | n/a | BRL | BRL | n/a |
| $C_9$-$C_{12}$ Aliphatic Hydrocarbons | BRL | BRL | BRL | BRL | n/a | BRL | BRL | n/a |
| $C_9$-$C_{10}$ Aliphatic Hydrocarbons | 6400 | 6500 | 1600 | 27 | 98.3 | 1500 | 35 | 97.7 |
| Unadjusted $C_5$-$C_8$ Aliphatic Hydrocarbons | 60000 | 53000 | 21000 | 72 | 99.7 | 21000 | 54 | 99.7 |
| $C_9$-$C_{12}$ Aliphatic Hydrocarbons | 7200 | 5900 | 1700 | 33 | 98.1 | 1800 | 35 | 98.1 |
| Methyl t-butyl ether | 62000 | 57000 | 24000 | 96 | 99.6 | 24000 | 90 | 99.6 |
| Benzene | 3400 | 2900 | 1100 | BRL | 100 | 1100 | BRL | 100 |
| Toluene | 12000 | 10000 | 3800 | BRL | 100 | 3700 | BRL | 100 |
| Ethylbenzene | 1500 | 1300 | 440 | BRL | 100 | 430 | BRL | 100 |
| Xylene total | 6300 | 5400 | 1350 | BRL | 100 | 1170 | BRL | 100 |
| Naphthalene | BRL | BRL | BRL | BRL | 100 | BRL | BRL | 100 |
| E Petroleum Hydrocarbons | | | | | | | | |
| $C_9$-$C_{18}$ Aliphatic Hydrocarbons | 3200 | 2200 | 2600 | BRL | 100 | 1600 | BRL | 100 |
| $C_{19}$-$C_{36}$ Aliphatic Hydrocarbons | 930 | 740 | 950 | BRL | 100 | 620 | BRL | 100 |
| $C_{11}$-$C_{22}$ Aliphatic Hydrocarbons | 2500 | 1900 | 2500 | BRL | 100 | 1400 | BRL | 100 |
| Unadjusted $C_{11}$-$C_{22}$ Aliphatic Hydrocarbons | 3000 | 2200 | 2800 | BRL | 100 | 1700 | BRL | 100 |

BRL: below recordable levels

It can be seen that a remarkable reduction in chemical components occurs both in the catch basin water and the discharge water over time. Note that the slight increase in percentage reduction from the 9:27 am on Day 4 discharge to the 1:59 pm on Day 4 discharge is due to the fact that the filter assembly reached a breakthrough point wherein the granulated activated carbon adsorbent could not adsorb any more contamination.

All cited patents, publications, co-pending applications, and provisional applications referred to in this application are herein incorporated by reference.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. A filter assembly, comprising:
a container having at least one inlet and at least one outlet;
a carrier which carries a microorganism capable of digesting hydrocarbons, wherein said carrier is present on an outside portion of the container; and
an adsorbent material present in at least a portion of the interior of said container between said at least one inlet and said at least one outlet.

2. The filter assembly according to claim 1, wherein said carrier does not substantially cover the least one inlet or the at least one outlet.

3. The filter assembly according to claim 1, wherein said container further comprises an overflow inlet, wherein said overflow inlet is configured such that water entering the overflow inlet substantially avoids passing through the portion of the container between said at least one inlet and said at least one outlet, which contains the adsorbent material.

4. The filter assembly according to claim 3, further comprising
an overflow conduit attached to said overflow inlet, wherein said overflow conduit has an inlet which is located above said at least one outlet and which allows passage of water from the inlet of the overflow conduit to said at least one outlet without substantially passing through said adsorbent.

5. The filter assembly according to claim 4, wherein said overflow conduit is an inverted U or gooseneck attached to the overflow inlet.

6. The filter assembly according to claim 1, wherein said carrier is foam.

7. The filter assembly according to claim 1, wherein said adsorbent material is granulated activated carbon.

8. The filter assembly according to claim 1, wherein the microorganism is from the domain Archaea.

9. The filter assembly according to claim 1, wherein the microorganism is contained in an inert material.

10. A bioremediating catch basin, comprising:
a catch basin, comprising a vessel having at least one catch basin inlet and at least one catch basin discharge; and
a filter assembly, comprising:
a container having at least one inlet and at least one outlet, wherein said at least one inlet is located below said at least one outlet;
a carrier which carries a microorganism capable of digesting hydrocarbons, wherein said carrier is present on an outside portion of the container,
wherein
(1) said at least one outlet of the filter assembly is attached, either directly or indirectly, to the at least one catch basin discharge, and (2) water entering through the catch basin inlet passes through the at least one inlet of the container to the at least one outlet of the container and exits the catch basin by the at least one catch basin discharge.

11. The bioremediating catch basin according to claim 10, wherein said carrier does not substantially cover the least one inlet or the at least one outlet of the container.

12. The bioremediating catch basin according to claim 10, further comprising
an adsorbent material present in at least a portion of the interior of said container between said at least one inlet and said at least one outlet.

13. The bioremediating catch basin according to claim 12, wherein said container further comprises an overflow inlet, wherein said overflow inlet is located above said at least one outlet and is present such that water entering the overflow inlet from the catch basin substantially avoids passing through the portion of the container between said at least one inlet and said at least one outlet, which contains the adsorbent material.

14. The bioremediating catch basin according to claim 13, further comprising an overflow conduit attached to said overflow inlet, wherein
(1) when a water level of the catch basin is at or below the level of an inlet to said overflow conduit, the water substantially passes through said adsorbent material prior to passing through the at least one outlet and the catch basin discharge, and floating material is substantially prevented from exiting the catch basin,
(2) when a water level of the catch basin is above the level of the inlet to said overflow conduit, water substantially bypasses the portion of the container containing the adsorbent by entering through the inlet of the overflow conduit and passing to the at least one outlet without substantially passing through said adsorbent, wherein said overflow conduit allows entry of water, but floating material is substantially prevented from entering the inlet of the overflow conduit.

15. The bioremediating catch basin according to claim 14, wherein said overflow conduit is an inverted U or gooseneck attached to the overflow inlet.

16. The bioremediating catch basin according to claim 12, wherein said adsorbent material is granulated activated carbon.

17. The bioremediating catch basin according to claim 10, wherein said carrier is located at least at the same level of the at least one discharge of the catch basin.

18. The bioremediating catch basin according to claim 10, wherein said carrier is foam.

19. The bioremediating catch basin according to claim 10, wherein the microorganism is from the domain Archaea.

20. The bioremediating catch basin according to claim 10, wherein the microorganism is contained in an inert material.

21. A method for bioremediation of water in a catch basin, comprising:
delivering contaminated water, which water contains dissolved hydrocarbons, to a bioremediating catch basin, comprising:
a catch basin, comprising a vessel having at least one catch basin inlet and at least one catch basin discharge; and
a filter assembly, comprising:
a container having at least one inlet and at least one outlet, wherein said at least one inlet is located below said at least one outlet;
a carrier which carries a microorganism capable of digesting hydrocarbons, wherein said carrier is present on an outside portion of the container,
wherein
(1) said at least one outlet of the filter assembly is attached, either directly or indirectly, to the at least one catch basin discharge, and
(2) water entering through the catch basin inlet passes through the at least one inlet of the container to the at least one outlet of the container and exits the catch basin by the at least one catch basin discharge;
allowing the hydrocarbons to access the foam carrying microorganisms;
allowing the microorganisms to convert the contaminants to natural byproducts; and
allowing bioremediated water to exit the catch basin.

22. A replaceable cartridge for a filter assembly, comprising:
a container having at least one inlet and at least one outlet,
on the inside of the container, an adsorbent material, and
on the outside of the container, a carrier which carries microorganisms capable of digesting hydrocarbons.

23. The replaceable cartridge for a filter assembly according to claim 22, wherein said carrier is foam.

24. The replaceable cartridge for a filter assembly according to claim 22, wherein said adsorbent material is granulated activated carbon.

* * * * *